US009912528B2

(12) United States Patent
Coburn et al.

(10) Patent No.: US 9,912,528 B2
(45) Date of Patent: Mar. 6, 2018

(54) SECURITY CONTENT OVER A MANAGEMENT BAND

(71) Applicant: McAfee, Inc., Santa Clara, CA (US)

(72) Inventors: Ward Coburn, Tigard, OR (US); Harvir Singh, Portland, OR (US)

(73) Assignee: McAfee, LLC, Plano, TX (US)

( * ) Notice: Subject to any disclaimer, the term of this patent is extended or adjusted under 35 U.S.C. 154(b) by 116 days.

(21) Appl. No.: 14/978,324

(22) Filed: Dec. 22, 2015

(65) Prior Publication Data

US 2017/0180191 A1 Jun. 22, 2017

(51) Int. Cl.
*H04L 29/06* (2006.01)
*H04L 12/24* (2006.01)
*H04L 29/08* (2006.01)

(52) U.S. Cl.
CPC ......... *H04L 41/0668* (2013.01); *H04L 29/06* (2013.01); *H04L 41/0631* (2013.01); *H04L 63/1441* (2013.01); *H04L 67/06* (2013.01)

(58) Field of Classification Search
CPC ..................................................... H04L 29/06
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 8,301,727 | B1* | 10/2012 | Coburn ............... H04L 63/0227 709/218 |
| 8,788,623 | B2 | 7/2014 | Coburn et al. |
| 2007/0061634 | A1* | 3/2007 | Marisetty ............ G06F 11/0706 714/48 |
| 2007/0297396 | A1* | 12/2007 | Eldar ...................... H04L 63/08 370/356 |
| 2007/0299951 | A1* | 12/2007 | Krithivas .............. G06F 3/0605 709/223 |

(Continued)

FOREIGN PATENT DOCUMENTS

| | | |
|---|---|---|
| KR | 1020090004445 | 1/2009 |
| WO | 2017112197 A1 | 6/2017 |

OTHER PUBLICATIONS

International Search Report and Written Opinion issued in PCT Application No. PCT/US2016/062967 dated Feb. 22, 2017; 10 pages.

*Primary Examiner* — Jason C Chiang
(74) *Attorney, Agent, or Firm* — Patent Capital Group

(57) ABSTRACT

There is disclosed in one example, a computing apparatus, having: first one or more logic elements comprising at least a processor and a memory to provide an operational environment; and second one or more logic elements providing an out-of-band management engine to function independently of the operational environment, and to: provide an out-of-band communication driver; determine that the operational environment has encountered an error that inhibits network communication; receive security content from a server via the out-of-band communication driver into a third-party storage area; and apply the security content to the computing apparatus. There is also disclosed a method of providing an out-of-band management engine, and one or more tangible, non-transitory computer-readable storage mediums having stored instructions for providing an out-of-band management engine.

24 Claims, 6 Drawing Sheets

(56) References Cited

U.S. PATENT DOCUMENTS

| | | | |
|---|---|---|---|
| 2009/0319782 A1* | 12/2009 | Lee | G06F 21/34 |
| | | | 713/156 |
| 2010/0088499 A1 | 4/2010 | Zimmer et al. | |
| 2012/0042195 A1* | 2/2012 | Marinelli | G06F 11/0712 |
| | | | 714/3 |
| 2012/0079118 A1* | 3/2012 | Bailey | H04W 4/001 |
| | | | 709/227 |
| 2012/0159137 A1* | 6/2012 | Khosravi | G06F 21/575 |
| | | | 713/2 |
| 2015/0081554 A1* | 3/2015 | Wong | G06Q 20/401 |
| | | | 705/44 |
| 2015/0082376 A1 | 3/2015 | McNair et al. | |
| 2015/0169875 A1* | 6/2015 | Ide | G06F 21/575 |
| | | | 713/2 |
| 2017/0011103 A1* | 1/2017 | Alva | G06F 3/0631 |

* cited by examiner

SECURITY CONTENT OVER A MANAGEMENT BAND

FIELD OF THE SPECIFICATION

This disclosure relates in general to the field of computer security, and more particularly, though not exclusively to, a system and method for providing security content over a management band.

BACKGROUND

In traditional security architecture, a computing device may run an in-band security agent that is dependent on the operating system (OS) and OS-provided TCP/IP stack to provide security updates. Specifically, when a security update is available, the security agent may download the update, apply the update, and restart affected software components (or, as necessary, reboot the system as a whole).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
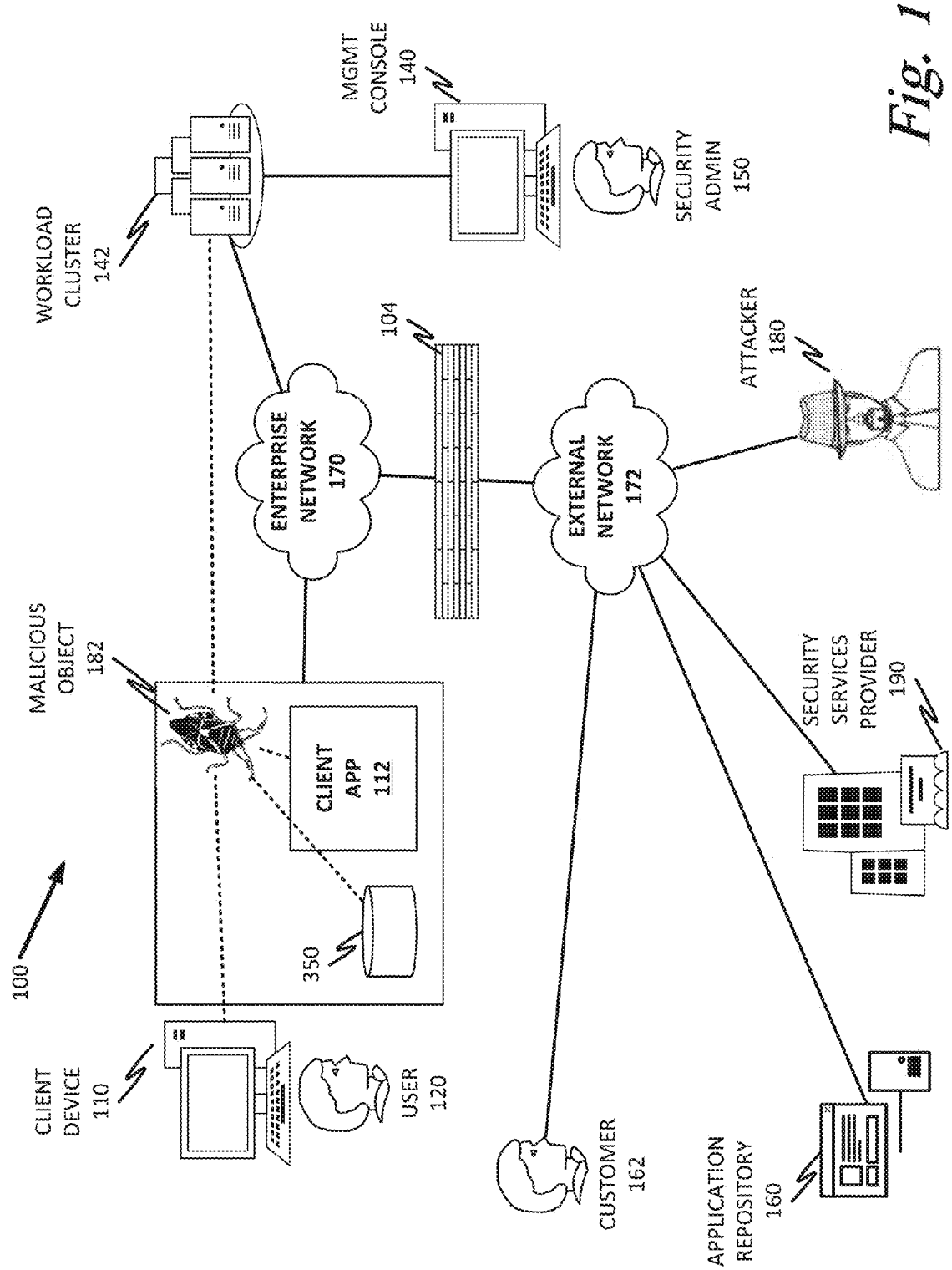
FIG. 1 is a block diagram of a security-enabled network according to one or more examples of the present specification.

There is disclosed in one example, a computing apparatus, having: first one or more logic elements comprising at least a processor and a memory to provide an operational environment; and second one or more logic elements providing an out-of-band management engine to function independently of the operational environment, and to: provide an out-of-band communication driver; determine that the operational environment has encountered an error that inhibits network communication; receive security content from a server via the out-of-band communication driver into a third-party storage area; and apply the security content to the computing apparatus. There is also disclosed a method of providing an out-of-band management engine, and one or more tangible, non-transitory computer-readable storage mediums having stored instructions for providing an out-of-band management engine.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

While traditional security updates are valuable, in some situations the device may be unable to connect to a network to receive the security content, thus preventing the devices from receiving the security content. For example, a malware payload may protect itself by inhibiting the TCP/IP stack, or by deliberately blocking communication with known security services provider. This can prevent the device from receiving security updates that could scrub the malware. It is also possible that a misconfiguration or other non-malicious error could inhibit communication, which in some cases may inhibit delivery of the very patch that would repair the issue.

When OS-based networking services are inhibited, the network infrastructure may still be fully functional. But when devices are unable to connect to the network and receive security content, devices may become vulnerable and may be a risk to the network. Ultimately, when the device is rebooted as a remediation action to correct the network connectivity problem, there may be a higher probability of contracting malware once connected to the network.

To mitigate these dangers, the present specification describes a system and method for providing security and other updates via out-of-band channels, such as a management band. Intel® vPro™-based Active Management Technology (AMT). AMT is an optionally-encrypted remotely-accessible out-of-band technology that enables a network administrator to remotely power up, power down, reset, boot, manage, or configure a connected device. This may include checking for the presence and viability of a security agent.

Advantageously, as described herein, AMT can remotely access a security update and reconfigure a machine, even if that machine's OS-based TCP/IP stack has been compromised via malware or misconfiguration. This can allow a remote administrator to properly configure the machine and reset it to a functional state, where additional reconfiguration can optionally be performed.

One feature of AMT is the ability to provision a "third-party storage area" (3PSA), which may be wholly dedicated to the AMT. This means that other processes cannot access or tamper with the 3PSA. This can be beneficial because at times, the size of a security patch to be installed may exceed the limited storage capacity of the AMT itself. Thus, the AMT can piecewise download the security patch, and then export each chunk to the 3PSA. Once the full patch is downloaded, the AMT can apply the patch from the 3PSA, thus restoring the machine to a usable state. After the machine has been restored, it can be restarted remotely, and the OS-based security agent can then perform additional cleanup, scanning, and other security services.

In an example of the present specification, the local AMT on a machine maintains a flag that indicates a good network connection, and in particular the ability to successfully communicate with a security management server operated by a security services provider. If the security agent on the machine detects that it can no longer successfully communicate with the security management server, it may set the flag, indicating a problem. Once the local AMT sees that the flag is set, it can proceed to seek and apply an update that will restore the machine to a functioning state. Alternatively, the flag could be configured so that it periodically resets itself. As long as the machine is functioning normally, the security agent may periodically clear the flag so that an alert is not triggered. However, if the security agent fails to clear the flag for a designated time, then the flag resets itself, indicating a problem. This can help prevent tampering even when the security agent is compromised.

A system and method for providing security content over a management band will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors.

It should also be noted that some functionality of endpoint devices 110 may be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142. In some cases, management console 140 may enable security administrator 150 to remotely manage client devices 110 via AMT.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Any network object that interferes with the proper function of client device 110 may be deemed a malicious object 182 by a security agent operating on client device 110. Any malicious object 182 may cause an error, including an error that prevents the operational environment (i.e., the environment that provides the primary function) of client device 110 from performing its function. An error can be particularly problematic when it also prevents the in-band operational environment, including a security agent 224 (FIG. 2) from accessing network resources.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign. Note that security services provider 190 may be an external entity, an internal security management team to secured enterprise 100, or a combination of the two. Security services provider 190 may provide a security management server 410 (FIG. 4), which may be operated either by security services provider 190, or by secured enterprise 100. McAfee® ePolicyOrchestrator is a nonlimiting example of one such security management server.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Security services provider 190 is most effective when a security management server 410 (FIG. 4) operated by security services provider 190 and client device 110 can reach each other via networks 170, 172. When errors prevent this communication from occurring, not only has client device 110 been compromised, but it may also compromise other devices on enterprise network 170. Such errors are difficult to repair, because client device 110 cannot download updates and patches from security services provider 190. Thus, as described in this specification, an out-of-band management method may be provided to enable installing patches and updates on even a compromised client device 110.

Figure 2:
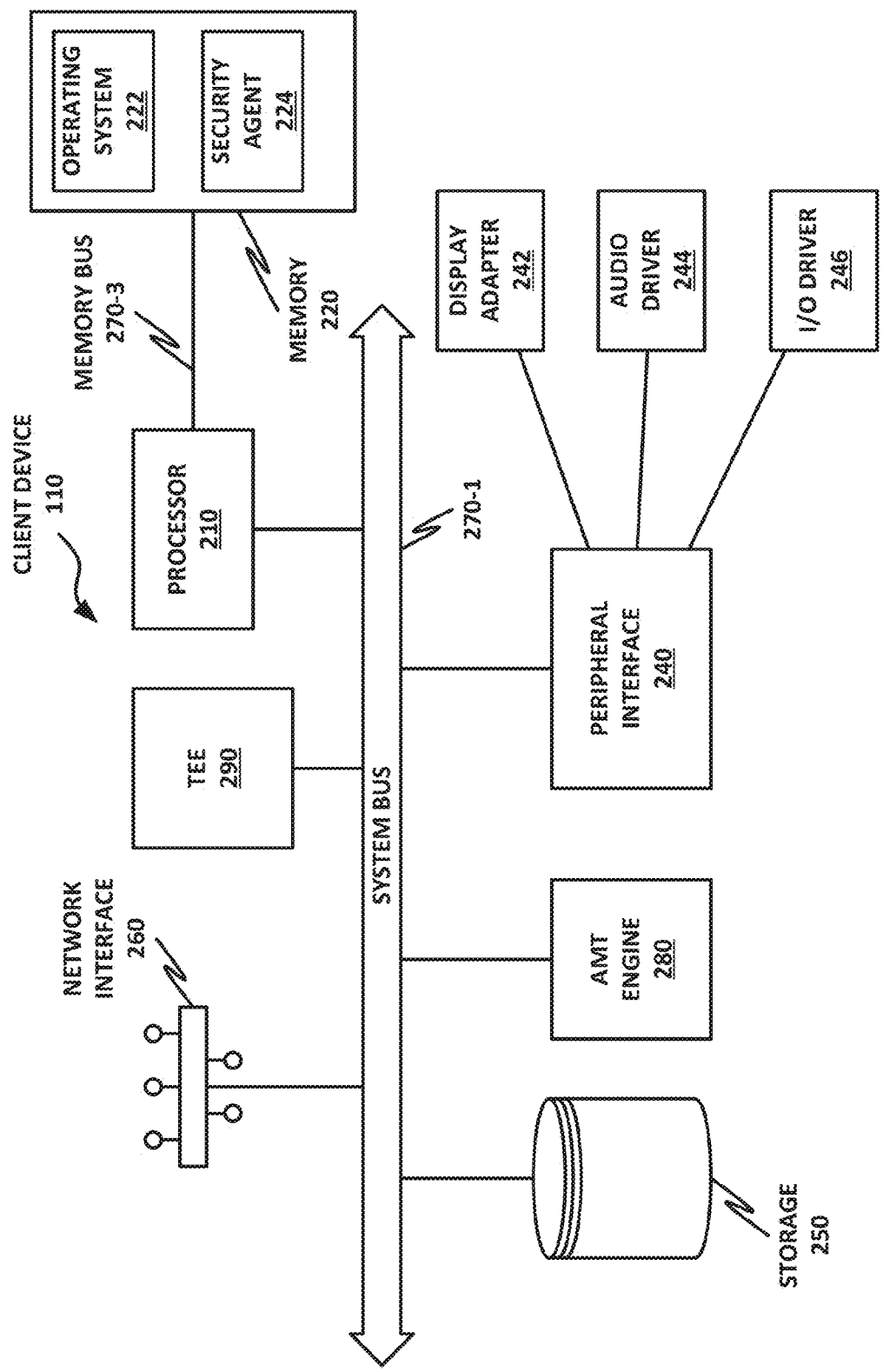
FIG. 2 is a block diagram of a computing device according to one or more examples of the present specification.

FIG. 2 is a block diagram of client device 110 according to one or more examples of the present specification. Client device 110 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Client device 110 includes a processor 210 connected to a memory 220, having stored therein executable instructions for providing an operating system 222 and at least software portions of a security agent 224. Other components of client device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 110 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security agent 224 may include one or more tangible non-transitory computer-readable mediums having stored thereon executable instructions operable to instruct a processor to provide a security agent 224. As used throughout this specification, an "engine" includes any combination of one or more logic elements, of similar or dissimilar species, operable for and configured to perform one or more methods provided by the engine. Thus, security agent 224 may comprise one or more logic elements configured to provide methods as disclosed in this specification. In some cases, security agent 224 may include a special integrated circuit designed to carry out a method or a part thereof, and may also include software instructions operable to instruct a processor to perform the method. In some cases, security agent 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security agent 224 may also include hardware and software, including configuration files, registry entries, and interactive or user-mode software by way of non-limiting example.

In one example, security agent 224 includes executable instructions stored on a non-transitory medium operable to perform a method according to this specification. At an appropriate time, such as upon booting client device 110 or upon a command from operating system 222 or a user 120, processor 210 may retrieve a copy of the instructions from storage 250 and load it into memory 220. Processor 210 may then iteratively execute the instructions of security agent 224 to provide the desired method.

Security agent 224 may be a local daemon process that runs under operating system 222, though there may also be portions of security agent 224 that operate independently of OS 222. Security agent 224 may be responsible for identifying, classifying, and remedying malware objects. However, this purpose can be frustrated if a malware object inhibits security agent 224's ability to communicate over the network, such as compromising the TCP/IP stack, or blocking addresses that direct to security services provider 190.

Operating system 222 and software depending from OS 222 (including security agent 224) may be deemed the "operational environment" for client device 110. These provide and support the primary workload of client device 110 and are more likely to be compromised by malicious objects 182. Thus, an AMT engine 280 is provided out-of-band, meaning that it operates as an out-of-band management engine that is independent of the operational environment. This ensures that errors in the operational environment are not propagated to the out-of-band management engine.

A TEE 290 may also be provided. TEE 290 is described in more detail in connection with FIG. 6.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
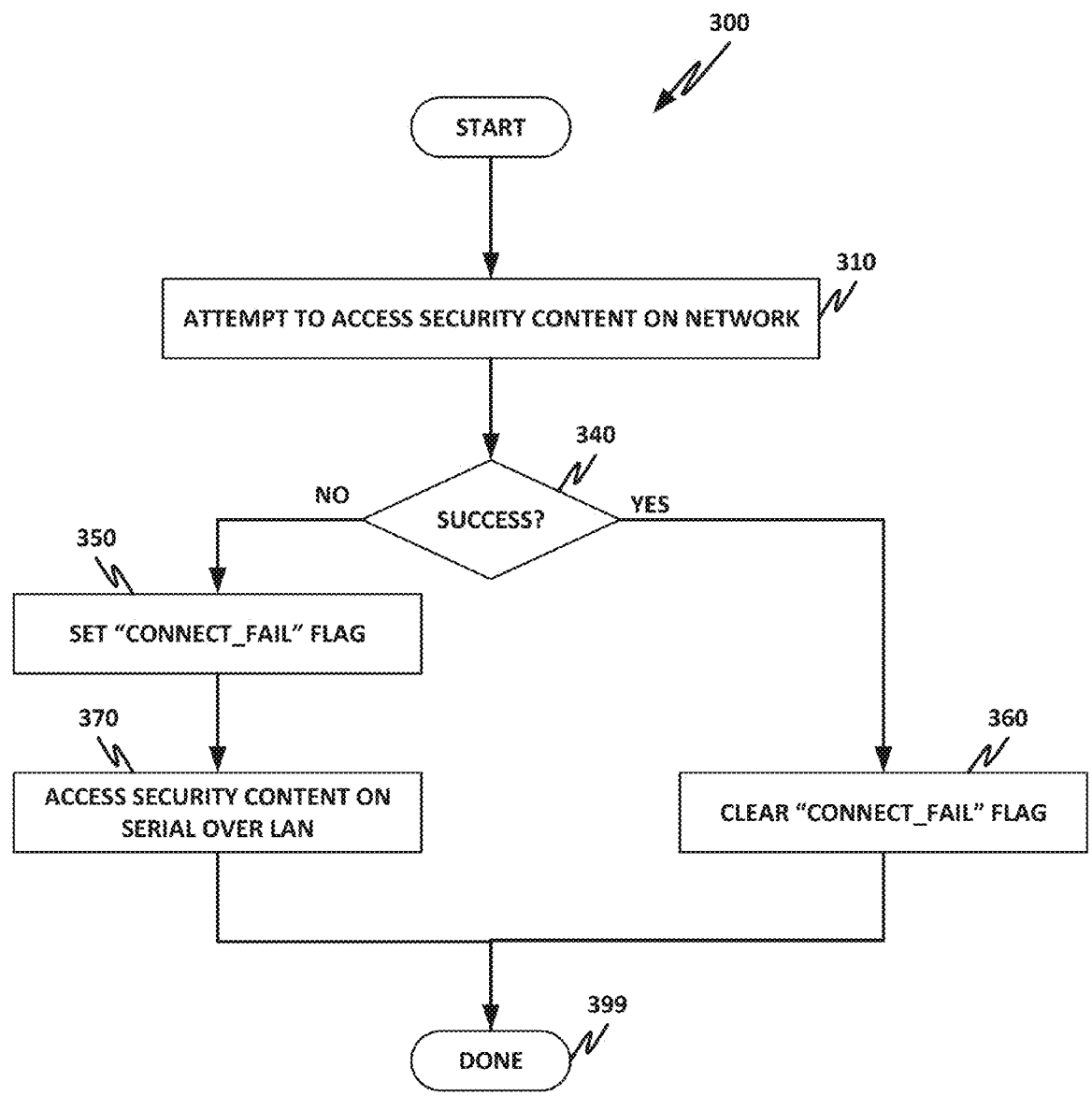
FIG. 3 is a flow chart of a method performed by an active management technology (AMT) engine according to one or more examples of the present specification.
Figure 4:
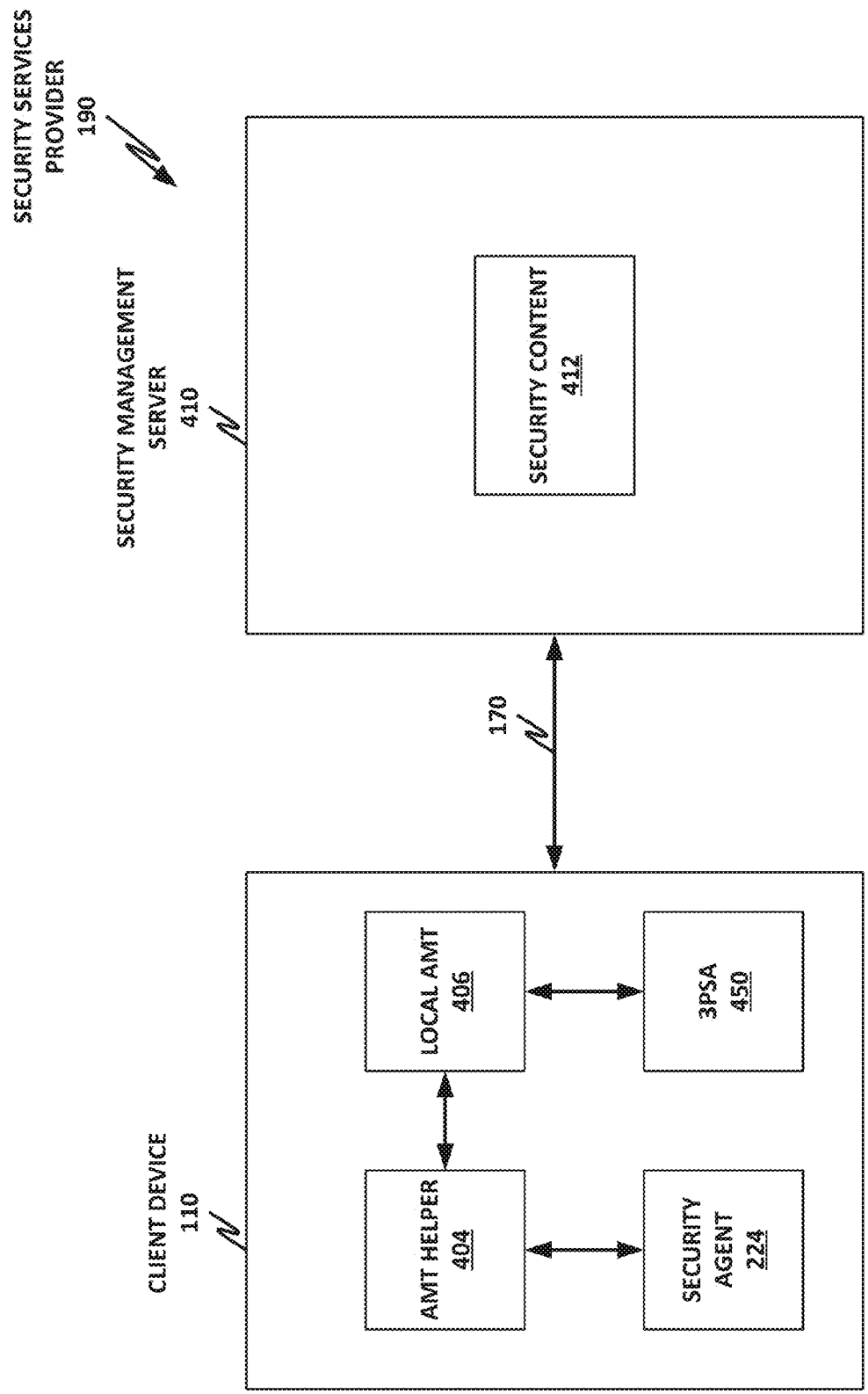
FIG. 4 is a block diagram of an AMT ecosystem according to one or more examples of the present specification.

FIG. 3 is a flow chart of a method 300 for receiving security content utilizing a serial over LAN (SoL) connection, according to one or more examples of the present specification. In an embodiment, method 300 may be performed by In block 310, security agent 224 attempts to connect to security content via a network 170, 172, such as attempting to contact security management server 410 (FIG. 4). The security content may include signatures for use in detecting malware, an application for detecting malware, a patch to correct an error or remediate malware, an upgrade, or any other appropriate content.

In decision block 340, if the attempt is successful, then in block 360, security agent 224 clears a "CONNECT_FAIL" flag. This is in an embodiment where the "CONNECT_FAIL" flag recycles itself periodically. In other words, the flag will set itself after a time if it has not received a reset signal. This is to ensure that the flag can be set even if security agent 224 has been compromised so that it does not proactively set the flag. In block 399, the method is done.

Returning to block 340, if the connection attempt is unsuccessful, then an error has been encountered. The error may include a failure associated with software, for example, the software may be necessary to connect to the network, such as a network driver, an operating system, an operating system module, a routing module, or similar. The cause of the error may be a malware object, or it may be a misconfiguration.

In block 350, a "CONNECT_FAIL" flag is set. This is for any embodiment in which the CONNECT_FAIL flag may be proactively set by security agent 224 or other in-band software. The CONNECT_FAIL flag may optionally be set in a storage area of AMT engine 280. This flag may be remotely readable by security management server 410. Thus, as disclosed herein, notifying security management server 410 of the error may include any suitable mechanism such as setting a flag, failing to clear a flag (either of which may include AMT engine 280 then notifying security management server 410, or security management server 410 remotely accessing and reading the flag), expressly notifying, expressly notifying a third-party device, or any other suitable mechanism.

In another embodiment, the unsuccessful attempt to connect to the network may be communicated by sending an error status event to a remote device, such as a cloud server, in response to the unsuccessful attempt to connect to the network. The error status event may include data indicating the unsuccessful attempt to connect to the network to access the security content at the remote second device. For example, the first device may be incapable of establishing a connection to the network for accessing the security content at the remote second device, but may be capable of establishing a connection to another network for sending the error status event to the remote third device. In an example, security agent 224 may be configured to periodically "check in" with a cloud service, in which case failure to check in may be the notification.

Figure 5:
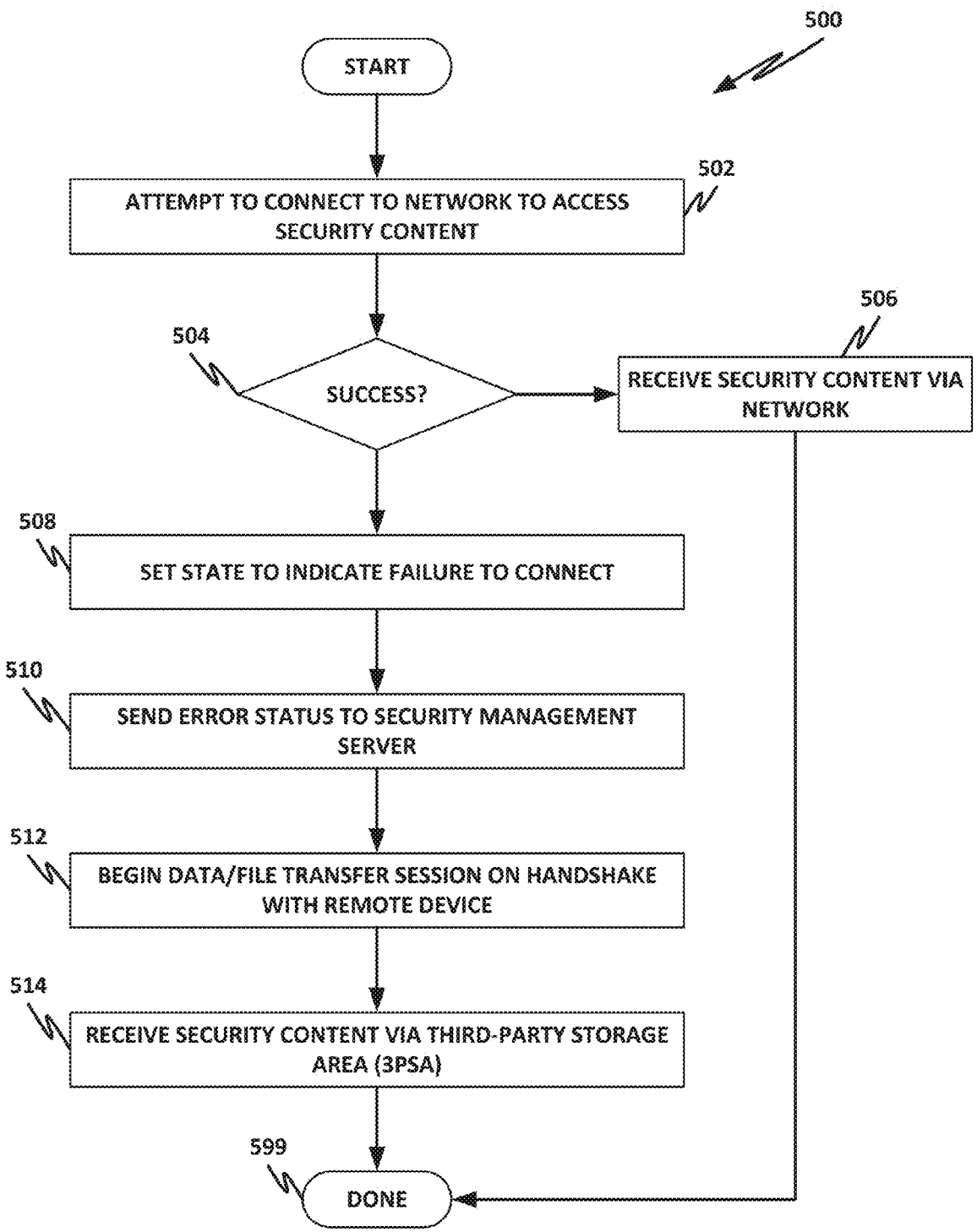
FIG. 5 is a flow chart of an AMT installing a security update according to one or more examples of the present specification.

In block 370, AMT engine 280 communicates with security management server 410 over an appropriate channel, in this case SoL. As appropriate to the embodiment, this communication may be initiated by either security management server 410 or by AMT engine 280. The SoL connection may include a connection between client device 110 and security management server 410 in which security management server 410 connects to a virtual serial port of the first device via an Ethernet port. For example, OS 222 may view the virtual serial port as a physical serial port of client device 110, while security management server 410 may establish the connection with the virtual serial port via an Ethernet port of the device. As another example, the SoL connection may include a connection by security management server 410 to an AMT BIOS or ROM of AMT engine 280. To this end, the SoL connection may be established utilizing a layer of client device 110 existing under OS 222 (e.g. operating system network drivers), and may interface directly with hardware of client device 110, such network interface 260. FIG. 5 discloses additional details connected with receiving security content into AMT engine 280.

As client device 110 receives the security content, it may use the security content to perform updates and remedy the error that caused the failure to connect. Once the error is remedied, the CONNECT_FAIL flag may be cleared. Alternately, client device 110 may later (before the security content has been applied) find that the network connection has been restored. In that case, it may clear the CONNECT_FAIL flag, and retrieve the security content in-band.

FIG. 4 is a block diagram of an ecosystem 400 providing out-of-band security content via a management band according to one or more examples of the present specification.

In this example, client device 110 is in communication with security management server 410, for example via a network 170. Client device 110 may include a processor equipped with Intel® AMT or equivalent. AMT engine 280 may include any or all of local AMT 406, AMT helper 404, and third-party storage area (3PSA) 450.

Security management server 410 may be provided by security services provider 190, may be administered by network administrator 150, or any suitable combination or variation.

AMT helper 404 may include any tool, service, module, or application, providing AMT services to client device 110. For example, AMT helper 404 may be created with the AMT software development kit (SDK) (e.g. version 5.1 or later) provided by Intel®. In one embodiment, AMT helper 404 may be deployed to client device 110 by security management server 410 as a package, and may install itself as an operating system service or daemon. In some embodiments, AMT helper 404 may be provisioned within, or may include an enclave 540 (FIG. 5) of TEE 290.

In use, a security agent 224 of client device 110 may execute tasks to receive security content 412 from the security management server 410. For example, the task may include an update task for updating security content of client device 110 using security content 412 from security management server 410. The task may include connecting to a network providing communications between client device 110 and security management server 410.

In response to an unsuccessful attempt to connect to the network by client device 110 resulting from an error, the error condition may be communicated to the AMT helper 404 of client device 110. The error condition may indicate the unsuccessful attempt to connect to the network. AMT helper 404 may receive the error condition and provide an indication of the unsuccessful attempt for detection by security management server 410.

In one embodiment, AMT helper 404 may provide an indication of the unsuccessful attempt with a flag, such as CONNECT_FAIL. For example, the unsuccessful attempt may be indicated by setting the flag in response to the unsuccessful attempt to connect to the network. The flag may optionally be set in a local storage area of local AMT 406 of client device 110.

The local storage area of local AMT 406 may be viewable/retrievable remotely by security management server 410 for detecting the flag. For example, security management server 410 may periodically execute a task that scans the local storage area of local AMT 406. This scan may detect whether a flag is set within local AMT 406.

In another embodiment, AMT helper 404 may provide the indication of the unsuccessful attempt by sending an error status event to the security management server 410 in response to the unsuccessful attempt to connect to the network. The error status event may include data indicating the unsuccessful attempt to connect to the network. Of course, it should be noted that the error status event may optionally only be sent to security management server 410 as a result of client device 110 attempting to connect to the network to access security content at a device separate from security management server 410. For example, client device 110 may be incapable of connecting to the network on which the device separate from security management server 410 is located for accessing the security content, but may be capable of connecting to a network on which security management server 410 is located for sending the error status event.

Upon detecting that client device 110 has failed to establish a connection, security management server 410 may establish an SoL connection with client device 110. As another option, security management server 410 may instruct another device to establish an SoL connection with client device 110.

The SoL connection may then be used to send security content 412 to client device 110. In this way, the security content provided to client device 110 may be stored by the security management server 410, in one embodiment, but in another embodiment may be stored on a remotely located device or distributed across a plurality of remotely located devices capable of establishing a serial over LAN connection to client device 110.

In one embodiment, security content 412 may be sent to AMT helper 404 of client device 110. AMT helper 404 may then write the received security content to one or more disk files. After the security content is received by AMT helper 404, AMT helper 404 may notify security agent 224 of the presence of the security content needing to be installed, such that in response security agent 224 may install the security content on client device 110.

In an embodiment where AMT helper sets a flag, AMT helper 404 may remove the flag in response to receipt of the security content. As another option, AMT helper 404 may remove the flag in response to a determination by client device 110 that a connection to the network has been successfully established.

In certain embodiments, it may be dangerous to load security content into local memory or storage, where it could be corrupted or compromised by the same malware object that caused the original problem. However, the local storage of local AMT 406 may not be sufficient to store the entire update, as this area may be very small. To mitigate this issue, a 3PSA 450 may be used instead. 3PSA 450 may be a storage area provided by the Intel® AMT SDK. 3PSA 450 may be relatively larger than local AMT 406, though it may still be small relative to the whole system. In some embodiments, data may be transferred via 3PSA 450 using a common, cooperative, overlapping I/O technique. In this case, data may be transferred into 3PSA 450 in small chunks, analogous to how data are commonly exchanged between two processes in an operating system shared memory segment (inter-process cooperation). Transfer via 3PSA 450 may be used instead of, or in conjunction with, the SoL described herein. In one example, an SoL connection may be attempted first, and the 3PSA transfer may be used as a failsafe if the SoL fails. In another embodiment, 3PSA transfer may be the primary method. It should be noted that any suitable device may assume the role of security management server 410 in this transaction, including a healthy peer device. This may be advantageous, because a malware object may block connections to known security remediation services, but may keep connections to peer devices open to try to infect them.

In some cases, 3PSA 450 may not be large enough to contain the entire update. In that case, data may need to be cycled through 3PSA 450, and then stored in local memory or stored to disk. To prevent corruption or tampering with the data, AMT helper 404 may provide a TEE 290 with a memory enclave 640 (FIG. 6), in which all data are encrypted and protected from access by non-TEE processes.

FIG. 5 is a flow chart of a method 500 of performing a 3PSA memory transfer according to one or more examples of the present specification. This method may be performed by AMT helper 404 of AMT 280, or by any suitable component of AMT engine 280.

In block 502, client 110 attempts to connect to a remote host, such as security management server 410. For example, the connection attempt may include an attempt to connect to the Internet. Further, the attempt may be made for downloading or otherwise retrieving security content from the remote device.

In decision block 504, client 110 determines whether the connection was successful. If the connection attempt is successful, then in block 506, client device 110 receives the security content via the network. As appropriate, security agent 224 may communicate the successful connection, such as clearing a CONNECT_FAIL flag as appropriate to the embodiment.

Returning to block 504, if the connection attempt was unsuccessful, then in block 508, security agent 224 sets a state indicating a failure to establish the connection. This failure to connect may be the result of any error as described herein. Setting the state may also take any of the forms described herein, such as setting a flag or otherwise providing a notification.

In block 510, as appropriate to the embodiment, security agent 224 or AMT engine 280 may provide an error status indicator to security management server 410.

In block 512, AMT helper 404 begins a data or file transfer session by performing a handshake with a remote device, such as security management server 410 or any other suitable device.

In block 514, AMT helper 404 receives security content via 3PSA 450. As described herein, 3PSA 450 may be larger than the internal storage area of local AMT 406, thus enabling a larger file transfer. However, 3PSA 450 may not be sufficiently large to store the entire security content. Thus, in certain embodiments, AMT helper 404 receives the security content piecewise, writing data into 3PSA 450 until it is full, and then writes the data out to a memory 220 or storage 250 so that the storage area in 3PSA 450 can be recycled. In some embodiments, a TEE 290 may be used to secure the data written out and to ensure that it cannot be tampered with or corrupted, for example by the same malware object 182 that caused the original problem. Once the security content has been applied, selected services may be restarted, or client device 110 may be remotely restarted via the AMT management band. After restarting, additional remedial action may be performed, such as performing a detailed scan, applying additional patches or security content, performing a detailed scrub, engaging in data recovery, or any other suitable security action.

In block 599, the method is done.

Figure 6:
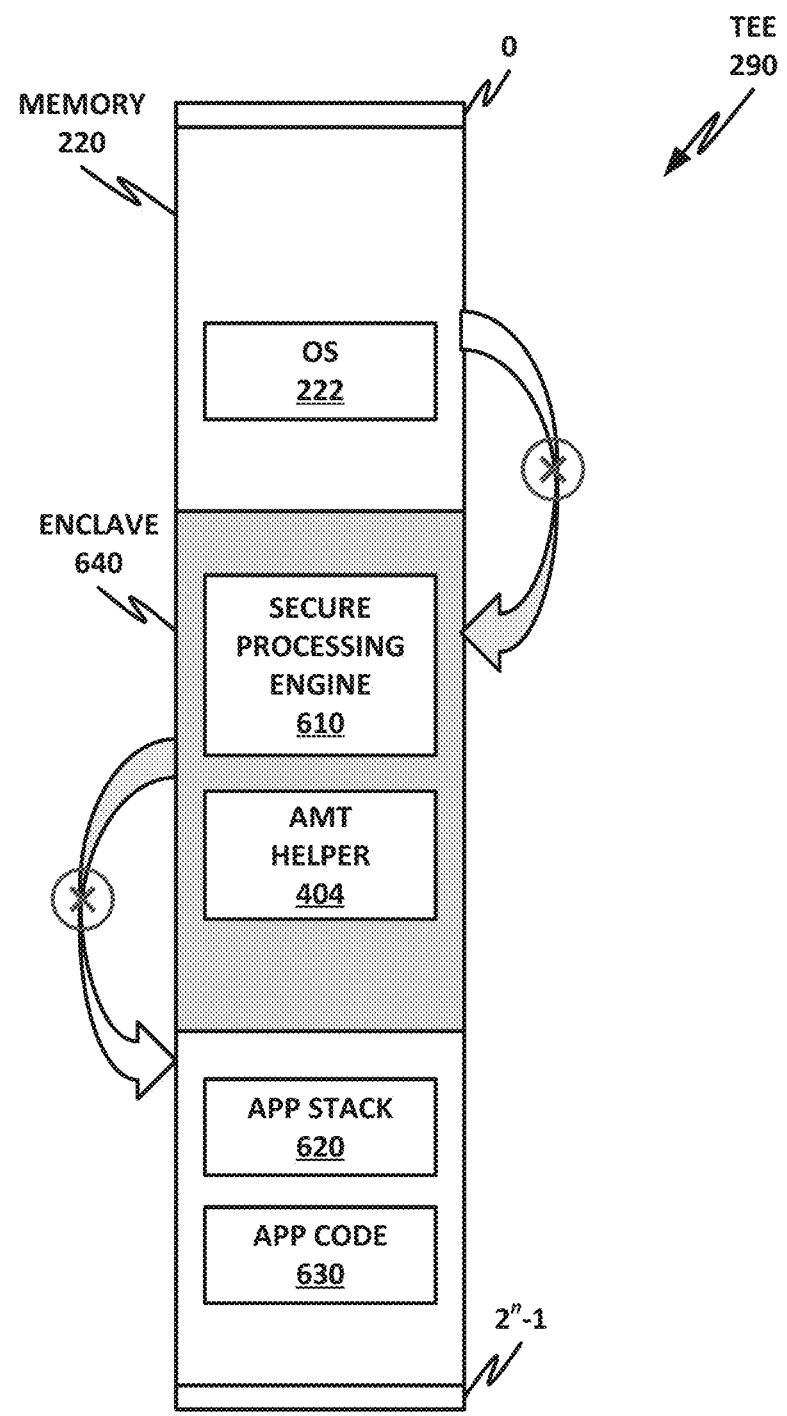
FIG. 6 is a block diagram of a trusted execution environment (TEE) according to one or more examples of the present specification.

FIG. 6 is a block diagram of a trusted execution environment (TEE) 290 according to one or more examples of the present specification.

In the example of FIG. 4, memory 220 is addressable by n-bits, ranging in address from 0 to $2^n-1$. Within memory 220 is an OS 222, enclave 640, application stack 620, and application code 630.

In this example, enclave 640 is a specially-designated portion of memory 220 that cannot be entered into or exited from except via special instructions, such as Intel® SGX or similar. Enclave 640 is provided as an example of a secure environment which, in conjunction with a secure processing engine 610, forms a trusted execution environment (TEE) 290 on client device 200. A TEE 290 is a combination of hardware, software, and/or memory allocation that provides the ability to securely execute instructions without interference from outside processes, in a verifiable way. By way of example, TEE 290 may include memory enclave 640 or some other protected memory area, and a secure processing engine 610, which includes hardware, software, and instructions for accessing and operating on enclave 640. Non-limiting examples of solutions that either are or that can provide a TEE include Intel® SGX, ARM TrustZone, AMD Platform Security Processor, Kinibi, securiTEE, OP-TEE, TLK, T6, Open TEE, and SierraTEE, CSE, VT-x, MemCore, Canary Island, Docker, and Smack. Thus, it should be noted that in an example, secure processing engine 610 may be a user-mode application that operates via a trusted execution framework within enclave 640. TEE 290 may also conceptually include processor instructions that secure processing engine 610 and the trusted execution framework required to operate within enclave 640.

Secure processing engine 610 and the trusted execution framework may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 620 and application code 630.

In certain systems, computing devices equipped with the Intel Software Guard Extension (SGX) or equivalent instructions may be capable of providing an enclave 640. It should be noted however, that many other examples of TEEs are available, and TEE 290 is provided only as one example thereof. Other secure environments may include, by way of nonlimiting example, a virtual machine, sandbox, testbed, test machine, or other similar device or method for providing a TEE 290.

In an example, enclave 640 provides a protected memory area that cannot be accessed or manipulated by ordinary computer instructions. Enclave 640 is described with particular reference to an Intel® SGX enclave by way of example, but it is intended that enclave 640 encompass any secure processing area with suitable properties, regardless of whether it is called an "enclave."

One feature of an enclave is that once an enclave region 640 of memory 220 is defined, as illustrated, a program pointer cannot enter or exit enclave 640 without the use of special enclave instructions or directives, such as those provided by Intel® SGX architecture. For example, SGX processors provide the ENCLU[EENTER], ENCLU[ERE-SUME], and ENCLU[EEXIT]. These are the only instructions that may legitimately enter into or exit from enclave 640.

Thus, once enclave 640 is defined in memory 220, a program executing within enclave 640 may be safely verified to not operate outside of its bounds. This security feature means that secure processing engine 610 is verifiably local to enclave 640. Thus, when an untrusted packet provides its content to be rendered within enclave 640, the result of the rendering is verified as secure.

Enclave 640 may also digitally sign its output, which provides a verifiable means of ensuring that content has not been tampered with or modified since being rendered by secure processing engine 610. A digital signature provided by enclave 640 is unique to enclave 640 and is unique to the hardware of the device hosting enclave 640.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: first one or more logic elements comprising at least a processor and a memory to provide an operational environment; and second one or more logic elements comprising an out-of-band management engine to function independently of the operational environment, and to: provide an out-of-band communication driver; determine that the operational environment has encountered an error that inhibits network communication; receive security content from a server via the out-of-band communication driver into a third-party storage area; and apply the security content to the computing apparatus.

There is further disclosed an example, wherein the operational environment is further to provide a notification of the error.

There is further disclosed an example, wherein the operational environment is to detect the error, and to provide a notification to the out-of-band management engine.

There is further disclosed an example, wherein providing a notification comprises setting or clearing a flag.

There is further disclosed an example, wherein providing a notification comprises sending a network message via the out-of-band communication driver.

There is further disclosed an example, wherein providing a notification comprises sending cloud notification message.

There is further disclosed an example, wherein the security content exceeds an available size of the third-party storage area, and wherein receiving the security content comprises writing blocks out to an external memory.

There is further disclosed an example, wherein the external memory is nonvolatile memory.

There is further disclosed an example, wherein the external memory is protected.

There is further disclosed an example, further comprising a trusted execution environment (TEE) to write the blocks out to the external memory.

There is further disclosed an example, wherein the server is a healthy peer system.

There is further disclosed in an example one or more tangible, non-transitory computer-readable mediums for providing out-of-band communication via a third-party storage area of an out-of-band management engine, the instructions to instruct a processor to: provide an operational environment; provide the out-of-band management engine to function independently of the operational environment, and to: provide an out-of-band communication driver; determine that the operational environment has encountered an error that inhibits network communication; receive security content from a server via the out-of-band communication driver into a third-party storage area; and apply the security content to the computing apparatus.

There is further disclosed an example, wherein the operational environment is further to provide a notification of the error.

There is further disclosed an example, wherein the operational environment is to detect the error, and to provide a notification to the out-of-band management engine.

There is further disclosed an example, wherein providing a notification comprises setting or clearing a flag.

There is further disclosed an example, wherein providing a notification comprises sending a network message via the out-of-band communication driver.

There is further disclosed an example, wherein providing a notification comprises sending cloud notification message.

There is further disclosed an example, wherein the security content exceeds an available size of the third-party storage area, and wherein receiving the security content comprises writing blocks out to an external memory.

There is further disclosed an example, wherein the external memory is nonvolatile memory.

There is further disclosed an example, wherein the external memory is protected.

There is further disclosed an example, further comprising a trusted execution environment (TEE) to write the blocks out to the external memory.

There is further disclosed an example, wherein the server is a healthy peer system.

There is further disclosed an example of a method of providing an operational environment and an out-of-band management engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
    first one or more logic elements comprising at least a processor and a memory to provide an operating system;
    second one or more logic elements comprising an out-of-band management engine to function independently of the operating system, and to:
        provide an out-of-band communication driver;
        determine that the operating system has encountered an error that inhibits network communication;
        communicate with a security update service via the communication driver;
        determine that the security update service has available an update to correct the error, and that the update exceeds in size a dedicated memory area for the out-of-band management engine;
        receive the update from the security service via the out-of-band communication driver into a third-party storage area; and
        apply the update to the computing apparatus; and
    a trusted execution environment (TEE) to write the blocks out to the external memory.

2. The computing apparatus of claim 1, wherein the operating system is further to provide a notification of the error.

3. The computing apparatus of claim 1, wherein the operating system is to detect the error, and to provide a notification to the out-of-band management engine.

4. The computing apparatus of claim 3, wherein providing a notification comprises setting or clearing a flag.

5. The computing apparatus of claim 3, wherein providing a notification comprises sending a network message via the out-of-band communication driver.

6. The computing apparatus of claim 3, wherein providing a notification comprises sending a cloud notification message.

7. The computing apparatus of claim 1, wherein the update from the security service exceeds an available size of the third-party storage area, and wherein receiving the update from the security service comprises writing blocks out to an external memory.

8. The computing apparatus of claim 7, wherein the external memory is nonvolatile memory.

9. The computing apparatus of claim 7, wherein the external memory is protected.

10. The computing apparatus of claim 1, wherein the security service is a healthy peer system.

11. One or more tangible, non-transitory computer-readable mediums for providing out-of-band communication via a third-party storage area of an out-of-band management engine, the instructions to instruct a processor to:
    provide a security agent within an operating system;
    provide the out-of-band management engine to function independently of the operating system, and to:
        provide an out-of-band communication driver;
        determine that the security agent has encountered an error that inhibits network communication;

communicate with a security update service via the communication driver;

determine that the security update service has available an update to correct the error, and that the update exceeds in size a dedicated memory area for the out-of-band management engine;

receive the update from the security service via the out-of-band communication driver into a third-party storage area;

apply the update to the computing apparatus; and provision a trusted execution environment (TEE) to write the blocks out to the external memory.

12. The one or more tangible, non-transitory computer-readable mediums of claim 11, wherein the security agent is further to provide a notification of the error.

13. The one or more tangible, non-transitory computer-readable mediums of claim 11, wherein the security agent is to detect the error, and to provide a notification to the out-of-band management engine.

14. The one or more tangible, non-transitory computer-readable mediums of claim 13, wherein providing a notification comprises setting or clearing a flag.

15. The one or more tangible, non-transitory computer-readable mediums of claim 13, wherein providing a notification comprises sending a network message via the out-of-band communication driver.

16. The one or more tangible, non-transitory computer-readable mediums of claim 13, wherein providing a notification comprises sending a cloud notification message.

17. The one or more tangible, non-transitory computer-readable mediums of claim 11, wherein the update exceeds an available size of the third-party storage area, and wherein receiving the update comprises writing blocks out to an external memory.

18. The one or more tangible, non-transitory computer-readable mediums of claim 17, wherein the external memory is nonvolatile memory.

19. The one or more tangible, non-transitory computer-readable mediums of claim 17, wherein the external memory is protected.

20. The one or more tangible, non-transitory computer-readable mediums of claim 17, wherein the security service is a healthy peer system.

21. A computer-implemented method for providing out-of-band communication via a third-party storage area of an out-of-band management engine, comprising:

providing an operating system;

providing the out-of-band management engine to function independently of the operating system;

providing an out-of-band communication driver;

determining that the operating system has encountered an error that inhibits network communication;

communicating with a security update service via the communication driver;

determining that the security update service has available an update to correct the error, and that the update exceeds in size a dedicated memory area for the out-of-band management engine;

receiving the update from the security service via the out-of-band communication driver into the third-party storage area;

applying the update to the computing apparatus; and write the blocks out to the external memory via a trusted execution environment (TEE).

22. The method of claim 21, wherein the operating system is further to provide a notification of the error.

23. The method of claim 21, wherein the update exceeds an available size of the third-party storage area, and wherein receiving the update comprises writing blocks out to an external memory.

24. The method of claim 21, wherein the security service is a healthy peer system.

* * * * *